Figure 7:
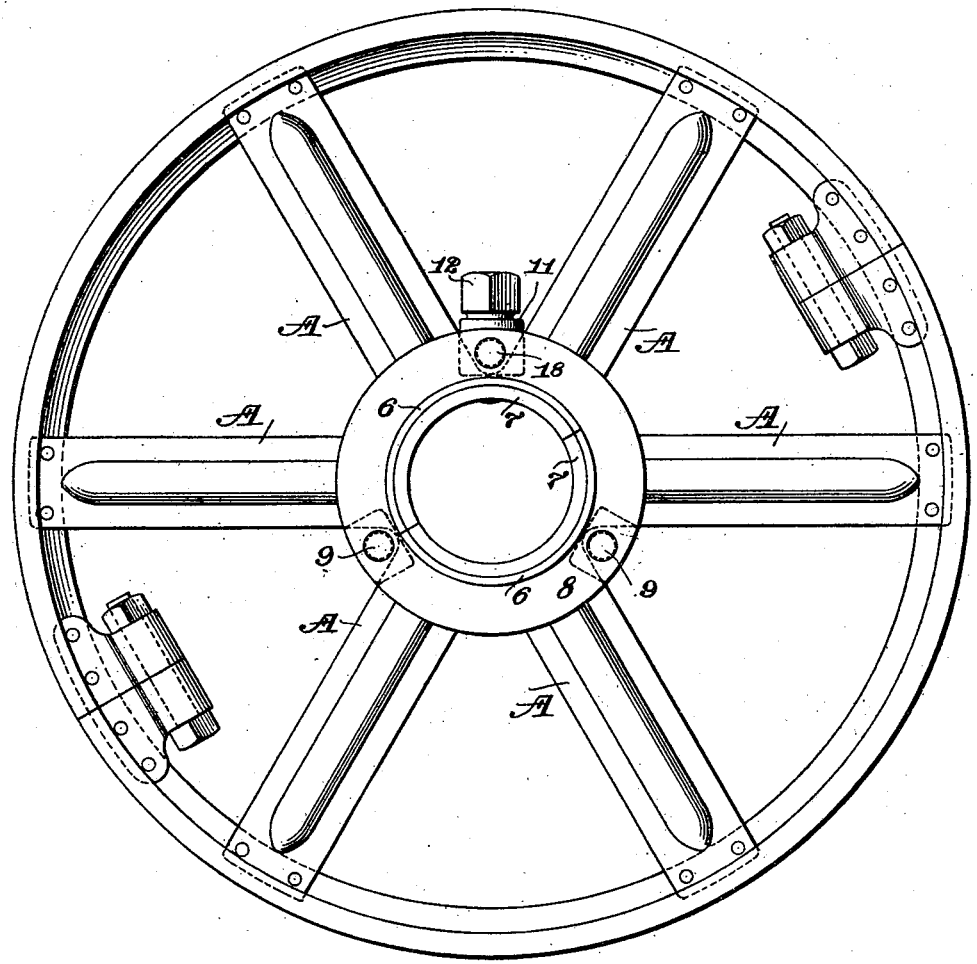

No. 646,414. Patented Apr. 3, 1900.
T. CORSCADEN.
PULLEY.
(Application filed May 8, 1897.)
(No Model.) 2 Sheets—Sheet 1.
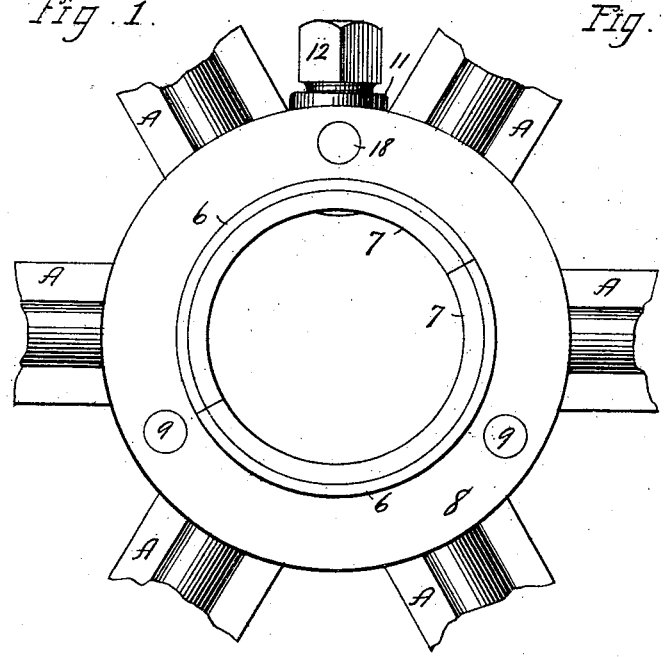
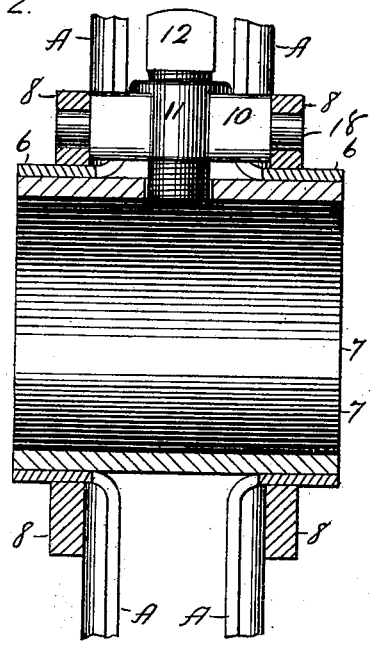
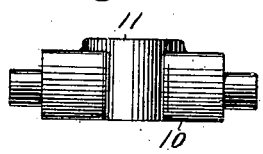
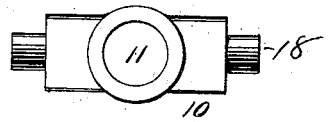
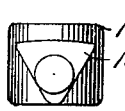
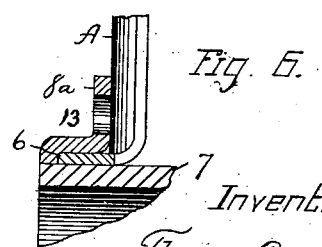
Witnesses
Inventor
Thomas Corscaden
By James Shepard
Att'y No. 646,414. Patented Apr. 3, 1900.
T. CORSCADEN.
PULLEY.
(Application filed May 8, 1897.)

(No Model.) 2 Sheets—Sheet 2.

Witnesses: Inventor:

UNITED STATES PATENT OFFICE.

THOMAS CORSCADEN, OF NEW BRITAIN, CONNECTICUT, ASSIGNOR TO THE AMERICAN PULLEY COMPANY, OF PHILADELPHIA, PENNSYLVANIA.

PULLEY.

SPECIFICATION forming part of Letters Patent No. 646,414, dated April 3, 1900.

Application filed May 8, 1897. Serial No. 635,659. (No model.)

*To all whom it may concern:*

Be it known that I, THOMAS CORSCADEN, a citizen of the United States, residing at New Britain, in the county of Hartford and State of Connecticut, have invented certain new and useful Improvements in Pulleys, of which the following is a specification.

My invention has reference to pulleys; and it consists of certain improvements which are fully set forth in the following specification and shown in the accompanying drawings, which form a part thereof.

The invention comprehends more particularly certain specific features of construction of the hub portion of a sheet-metal pulley, whereby lightness and durability are secured with an efficient manner of clamping the pulley upon a shaft.

In carrying out my invention I provide the radial sheet-metal spokes with outwardly-directed semicircular flanges, which are received upon hub-shells and upon which they are firmly held by annular plates or rings forced over the said semicircular flanges to hold them upon the said hub-shells. These annular plates or rings are preferably connected at intervals by transverse rivets or connections extending between the radial spoke-arms. One of the said transverse connections between the two annular plates or rings is provided with a screw-threaded socket for a set-screw at a point intermediate of the outwardly-directed hub-flanges of the spoke-arms and adapted to extend through a hole in the hub-shell to act upon the shaft for the purpose of securing or gripping the pulley upon the said shaft.

My invention will be better understood by reference to the accompanying drawings, in which—

Figure 1 is a side elevation of the hub portion of my improved pulley. Fig. 2 is a sectional view of same, partly in elevation, on a vertical plane through the axis of the pulley when in the position shown in Fig. 1. Fig. 3 is a detached side elevation of the trunnion-block for the set-screw. Fig. 4 is a plan view of same. Fig. 5 is an end view of same. Fig. 6 is a sectional view corresponding to a portion of Fig. 2 and illustrating a modification of the annular plates or rings, and Fig. 7 is a side elevation of a complete pulley embodying the invention.

The pulley-rim is not shown and may be of any ordinary construction. I have illustrated the spoke-arms A as arranged in pairs somewhat separated at the hub portions and each pair provided with an outwardly-turned semicircular flange 6, which in the complete wheel forms a sectional cylinder and rests upon the outside of the hub-shell 7 7. This hub-shell may be formed of a complete cylinder; but I prefer to form it of two semicylindrical sections, substantially as shown, and the flanges 6 of the spokes may be secured thereto, if desired, by rivets; but whether they are so secured or not I bind the pulley parts together to make a solid hub by means of sheet-metal annular parts or rings 8 8, arranged over the outer ends of the said spoke-flanges 6 and so as to project therefrom in an edgewise direction or in the plane of rotation. In other words, the binding plates or rings 8 8 each constitute an extended outwardly-directed flange, whereby they have great strength and at the same time present a suitable support for the connecting devices for carrying the clamping means. These rings or annular parts 8 8 are brought substantially up to the outer surfaces of the spoke-arms and may hold themselves in position simply by friction, such as would result in either driving them on or shrinking them on in the well-known manners. I prefer, however, to connect the said annular parts or rings 8 8 by transverse connecting devices 9, which may be in the form of rivets or otherwise constructed—for example, similar to the parts 10 for carrying the set-screws, except that in this case there would be no necessity for having screw-threaded portions 11.

The trunnion-block 10 is provided on its ends with extensions 18, passing through the annular parts or rings 8 8 and, if desired, may be riveted therein. The part 10 intermediate of the two rings 8 8 may be made V-shaped or triangular in form, as shown more fully in Fig. 5, to fit into the open space between the adjacent spokes. The middle portion is provided with a hub 11, screw-threaded to receive a set-screw 12 for clamping the pulley upon the shaft which extends through the hub-shell 7. The set-screw operates freely through an enlarged hole in the hub-shell and in operation transmits its strains directly to the annular parts or rings 8 8 through the trunnion-block 10.

While I have designated the part 10 as a trunnion-block, it is not essential that it shall have any movement on its trunnions or connections 18, and it may therefore be constructed in any suitable manner, so long as it is secured to or carried by said rings.

While I prefer to form the annular parts or rings 8 8 of flat plates stamped out by dies, it is evident that such plates may be shaped in cross-sections, such as illustrated in Fig. 6, in which the outwardly-extending flange $8^a$ may be made with a sleeve or hub portion 13 at the base or inner edge, so as to tightly fit over the hub-flanges 6 and completely shield the same.

By my improvements I produce a solid hub for a pulley, which may be mainly formed of such parts as are ordinarily used for a divided or split pulley, and at the same time I make a very firm and rigid hub. By riveting the annular parts or rings together by the connecting devices simple and efficient means are provided for preventing any possibility of the rings working out of place, and a suitable support is also provided for the reception of an ordinary set-screw in a pulley formed mainly of sheet metal.

I do not limit myself to the precise details of construction, as they may be modified without departing from the spirit of my invention.

Having now described my invention, what I claim as new, and desire to secure by Letters Patent, is—

1. The combination in a pulley of the cylindrical shell, with two sets of spoke-arms each provided with outwardly-extending hub-flanges 6 directly resting upon the hub-shell, two annular parts or rings tightly fitting upon the outwardly-directed hub-flanges and clamping them upon the hub-shell, a transverse block or part extending from ring to ring between the spokes, and the clamping-screw extending transversely through the block at a point intermediate of the two sets of spoke-arms and projecting through an aperture in the hub-shell.

2. The combination in a pulley of the cylindrical shell, with two sets of spoke-arms each provided with outwardly-extending hub-flanges 6 directly resting upon the hub-shell, two annular parts or rings tightly fitting upon the outwardly-directed hub-flanges and clamping them upon the hub-shell, a transverse block or part extending from ring to ring between the spokes, a clamping-screw extending transversely through the block at a point intermediate of the two sets of spoke-arms and extending through an aperture in the hub-shell, and means also extending through the space between the spoke-arms for uniting the two rings together at intervals whereby said rings cannot separate and loosen the clamping-screw and its supporting-block.

3. The combination in a pulley of the cylindrical shell, with two sets of spoke-arms each provided with outwardly-extending hub-flanges 6 directly resting upon the hub-shell, two annular parts or rings tightly fitting upon the outwardly-directed hub-flanges and clamping them upon the hub-shell, a transverse block extending from ring to ring between the spoke-arms said block having a cylindrical screw-threaded hub portion together with two lateral triangular portions to fit singly in the spaces between the spokes and trunnion or rivet portions to fit into and through the rings, and a clamping-screw extending transversely through the block at a point intermediate of the two sets of spoke-arms and extending through an aperture in the hub-shell.

THOMAS CORSCADEN.

Witnesses:
C. G. REYNOLDS,
F. G. WILSON.